March 10, 1936.  J. BALTON  2,033,673
ICE CREAM CONE
Filed June 22, 1934
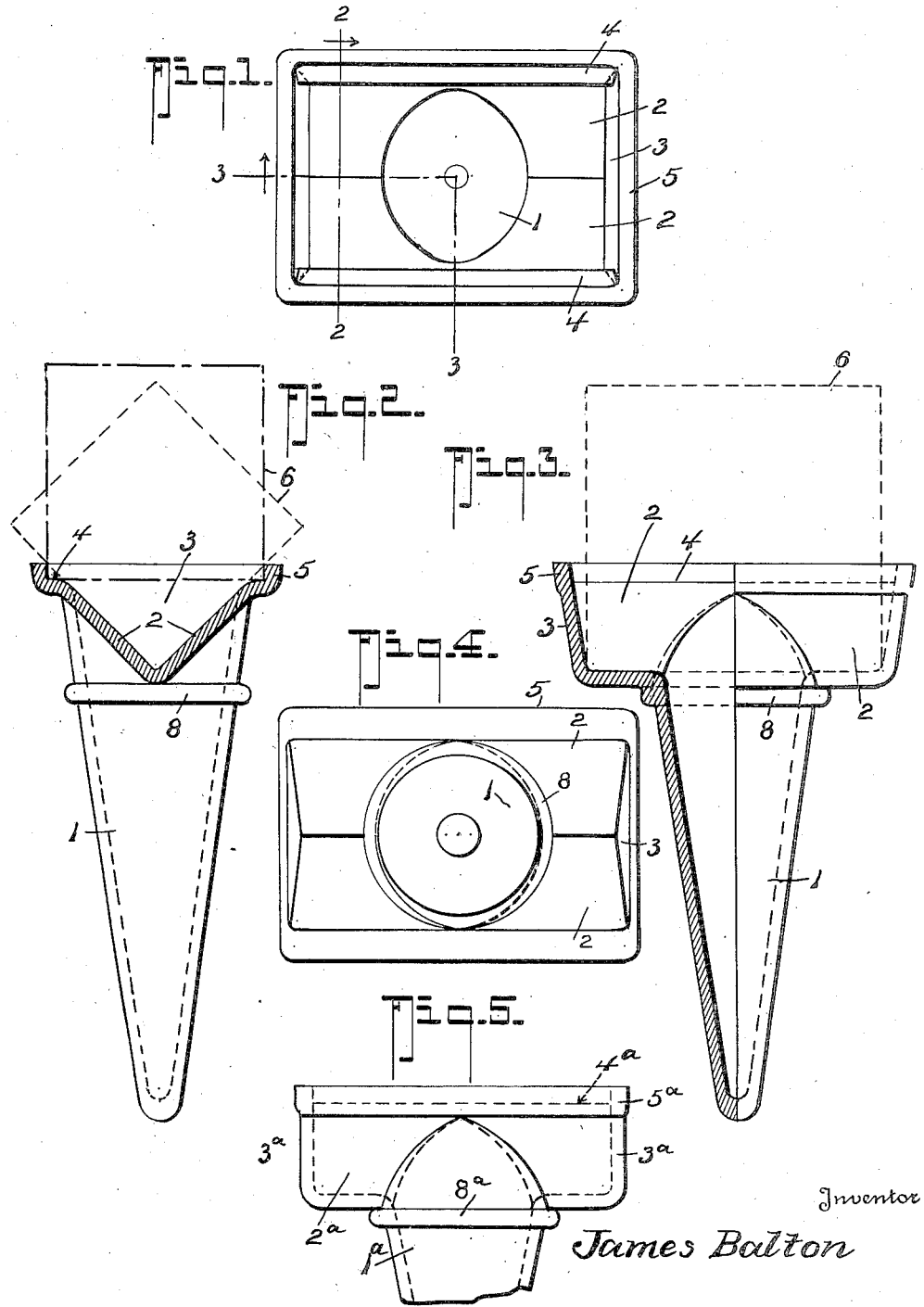
Inventor
James Balton
By Albert E. Dieterich
Attorney Patented Mar. 10, 1936

2,033,673

UNITED STATES PATENT OFFICE 2,033,673

ICE CREAM CONE

James Balton, Baltimore, Md., assignor of one-fourth to Joseph Shapiro, Baltimore, Md.; one-fourth to Isaac Shapiro, Chicago, Ill.; one-fourth to Nathan Shapiro and one-fourth to Samuel Shapiro, both of Chelsea, Mass.

Application June 22, 1934, Serial No. 731,993

8 Claims. (Cl. 99—11)

My invention relates to certain new and useful improvements in ice cream cones and it primarily has for its object to provide a cone to hold a rectangular block of ice cream. Plans are being made by some ice cream concerns for serving ice cream in cones without dipping. The serious objection to the dipping method of filling ice cream cones is that not enough ice cream is dipped from a gallon. The number of cones that can be served from a gallon of ice cream by the dipping method depends mainly on the skill of the one who is dispensing the ice cream.

Where the ice cream is put up in rectangular blocks dipping is unnecessary. In order to take care of such blocks of ice cream and hold them either sidewise or edgewise, as may be desired, I have devised the cone herein shown and described.

Other objects will in part be obvious and in part be pointed out hereinafter.

To the attainment of the aforesaid objects and ends, the invention still further resides in those novel details of construction, combination and arrangement of parts, all of which will be first fully described in the following detailed description, then be pointed out in the appended claims, reference being had to the accompanying drawing, in which:

Figure 1 is a top plan plan view of one embodiment of my invention.

Figure 2 is a cross section taken on the line 2—2 of Figure 1, looking in the direction of the arrow.

Figure 3 is a part side elevation and part section taken on the line 3—3 of Figure 1.

Figure 4 is an inverted plan view of the cone shown in Figures 1, 2 and 3.

Figure 5 is a detail side elevation of a slight modification of the invention.

In the drawing, in which like numbers and letters of reference indicate like parts in all of the figures, 1 represents the stem of the cone which is of the usual conical form. At the upper end of the stem there is constructed a laterally elongated bowl comprising front and back sides 2—2 inclined at a right angle to one another, and ends 3 which may taper downwardly and inwardly with the slant of the stem 1, as shown in Figures 3 and 4, or which may be parallel as at 3a—3a in Figure 5.

Along the front and back sides of the bowl and within the same is molded a shoulder 4 constituting a shelf on which the block of ice cream 6 may be laid on a flat side of the block. The mouth of the cone is provided with the bead or reinforcement 5, as indicated. With the construction as shown, the block of ice cream 6 may be set over on its flat side on the shoulders 4 (see dot and dash lines, Figure 4) or it may rest on the walls 2—2 edgewise (as shown in dotted lines 2).

In Figure 5 the parts having corresponding functions and relative structure to the preceding figures have the same reference number plus the index letter a, and a further detailed description thereof is thought to be unnecessary.

If desired I may provide the stem 1 with a nesting ring 8 so that all danger of cutting into a cone beneath by the meeting edge of the walls 2—2 of a cone above, when the cones are nested, is avoided, the nesting ring 8 resting at the upper extremity of the stem 1 of a cone beneath while the lower meeting edge of the walls 2—2 will rest on the flange 5 of the cone beneath.

What I claim is:

1. An ice cream cone comprising a stem and a laterally elongated bowl at the top of the stem, said bowl having flat front and back walls inclined downwardly and toward one another and having end walls, to receive a rectangular block of ice cream edgewise with one face of the block against the front wall and an adjacent face against the back wall of the bowl.

2. An ice cream cone comprising a stem and a laterally elongated bowl at the top of the stem, said bowl having flat front and back walls inclined downwardly and toward one another and having end walls, to receive a rectangular block of ice cream edgewise with one face of the block against the front wall and an adjacent face against the back wall of the bowl, said bowl having along the front and back walls adjacent the mouth of the cone shoulders constituting a shelf to receive a block of ice cream on its flat side.

3. An ice cream cone comprising a hollow stem of conical form and a bowl laterally elongated at each side of the stem, said bowl having its front and back walls inclined downwardly and inwardly to make a right angle with one another, said bowl including end walls.

4. An ice cream cone comprising a hollow stem of conical form and a bowl laterally elongated at each side of the stem, said bowl having its front and back walls inclined downwardly and inwardly to make a right angle with one another, said bowl including end walls inclined downwardly toward each other approximately parallel with the sides of the stem.

5. An ice cream cone comprising a hollow stem of conical form and a bowl laterally elongated at each side of the stem, said bowl having its front and back walls inclined downwardly and inwardly to make a right angle with one another, said bowl including end walls, said bowl having shoulders on the front and back walls within the bowl adjacent the mouth thereof to constitute an ice cream block receiving shelf.

6. An ice cream cone comprising a hollow stem of conical form and a bowl laterally elongated at each side of the stem, said bowl having its front and back walls inclined downwardly and inwardly to make a right angle with one another, said bowl including end walls inclined downwardly toward each other approximately parallel with the sides of the stem, and said bowl having shoulders on the front and back walls within the bowl adjacent the mouth thereof to constitute an ice cream block receiving shelf.

7. An ice cream cone comprising a hollow stem of conical form and a bowl laterally elongated at each side of the stem, said bowl having its front and back walls inclined downwardly and inwardly to make a right angle with one another, said bowl including end walls, and a nesting ring on said stem cooperating with the lower meeting edge of the front and back walls to support the cone when nested.

8. An ice cream cone comprising a stem and a laterally elongated bowl at the top of the stem, said bowl having flat front and back walls inclined downwardly and toward one another and having end walls, to receive a rectangular block of ice cream with one face of the block against the front wall and an adjacent face against the back wall of the bowl, and a nesting ring around the stem adjacent the lower meeting edge of said front and back walls.

JAMES BALTON.